(12) United States Patent
Kanda

(10) Patent No.: US 12,054,251 B2
(45) Date of Patent: Aug. 6, 2024

(54) ELECTRONIC DEVICE, METHOD FOR CONTROLLING ELECTRONIC DEVICE AND PROGRAM FOR CONTROLLING ELECTRONIC DEVICE

(71) Applicant: KYOCERA Corporation, Kyoto (JP)

(72) Inventor: Toi Kanda, Ritto (JP)

(73) Assignee: KYOCERA Corporation, Kyoto (JP)

( * ) Notice: Subject to any disclaimer, the term of this patent is extended or adjusted under 35 U.S.C. 154(b) by 686 days.

(21) Appl. No.: 17/054,022

(22) PCT Filed: Apr. 23, 2019

(86) PCT No.: PCT/JP2019/017245
§ 371 (c)(1),
(2) Date: Nov. 9, 2020

(87) PCT Pub. No.: WO2019/230265
PCT Pub. Date: Dec. 5, 2019

(65) Prior Publication Data
US 2021/0229806 A1    Jul. 29, 2021

(30) Foreign Application Priority Data

May 29, 2018    (JP)  ................ 2018-102541

(51) Int. Cl.
*B64C 39/02*    (2023.01)
*B64U 10/13*    (2023.01)
*B64U 101/30*    (2023.01)

(52) U.S. Cl.
CPC ............ *B64C 39/024* (2013.01); *B64U 10/13* (2023.01); *B64U 2101/30* (2023.01)

(58) Field of Classification Search
CPC .......... B64C 39/02; B64C 39/024; G05D 1/00
See application file for complete search history.

(56) References Cited

U.S. PATENT DOCUMENTS

| | | | |
|---|---|---|---|
| 3,785,316 A | 1/1974 | Leming et al. | |
| 8,162,256 B2 | 4/2012 | Goossen et al. | |
| 9,301,865 B2 * | 4/2016 | Farco | A44C 15/00 |
| 9,902,504 B2 | 2/2018 | Moore | |
| 10,746,348 B2 * | 8/2020 | Strahlendorf | F16M 11/2021 |
| 11,008,101 B2 * | 5/2021 | Miller | B64D 1/22 |
| 2009/0236470 A1 | 9/2009 | Goossen et al. | |
| 2015/0239578 A1 | 8/2015 | McGeer | |
| 2016/0347192 A1 | 12/2016 | Lee et al. | |
| 2018/0245365 A1 * | 8/2018 | Wankewycz | H02J 7/00 |
| 2019/0291867 A1 * | 9/2019 | Fiaz | H01F 7/0257 |
| 2020/0130833 A1 * | 4/2020 | Miller | B64B 1/50 |

(Continued)

FOREIGN PATENT DOCUMENTS

| | | | | |
|---|---|---|---|---|
| EP | 3698680 A1 * | 8/2020 | ........... | A47G 29/141 |
| JP | H06-144395 A | 5/1994 | | |

(Continued)

*Primary Examiner* — Yonel Beaulieu
(74) *Attorney, Agent, or Firm* — Studebaker & Brackett PC

(57) ABSTRACT

Provided is an electronic device 1 including an attachment mechanism 32, a first slide mechanism 10 and a second slide mechanism 20. The attachment mechanism 32 attaches a flight device 100. The first slide mechanism 10 slides the attachment mechanism 32 in a first direction. The second slide mechanism 20 slides the attachment mechanism 32 in a second direction different from the first direction.

11 Claims, 8 Drawing Sheets

(56) References Cited

U.S. PATENT DOCUMENTS

| | | | |
|---|---|---|---|
| 2020/0255148 A1* | 8/2020 | Singer | B64D 1/22 |
| 2022/0055770 A1* | 2/2022 | O'Toole | B64U 50/19 |
| 2022/0144435 A1* | 5/2022 | Gielen | B64D 1/22 |
| 2023/0034243 A1* | 2/2023 | Ceborahs | B64U 60/20 |
| 2023/0098602 A1* | 3/2023 | Cella | B33Y 40/00 |
| | | | 700/248 |

FOREIGN PATENT DOCUMENTS

| | | | |
|---|---|---|---|
| JP | 2009-227270 A | 10/2009 | |
| JP | 2016-165215 A | 9/2016 | |
| JP | 2016-175490 A | 10/2016 | |
| WO | 2018/011879 A1 | 1/2018 | |
| WO | WO-2018057034 A1 * | 3/2018 | B64C 39/024 |

* cited by examiner

ELECTRONIC DEVICE, METHOD FOR CONTROLLING ELECTRONIC DEVICE AND PROGRAM FOR CONTROLLING ELECTRONIC DEVICE

CROSS-REFERENCE TO RELATED APPLICATION

This application claims priority to and benefit of Japanese Patent Application No. 2018-102541 filed on May 29, 2018, the entire contents of which are incorporated herein by reference.

TECHNICAL FIELD

This disclosure relates to an electronic device, a method for controlling an electronic device and a program for controlling an electronic device. More specifically, this disclosure relates to an electronic device configured to stop a flight device such as a drone, a method for controlling such an electronic device and a program for controlling such an electronic device.

BACKGROUND

In recent years, typically unmanned flight devices, such as drones, have become rapidly popular. For example, a flight device such as an unmanned small multi-copter equipped with an imaging device such as a camera is commercially available. According to such a flight device, it is possible to capture a still image or a moving image from a place where a person cannot easily reach. It is expected that such an unmanned small flight device will become increasingly popular in the future with expansion of applications and progress in legal development.

When the above described flight device is driven by the battery power, it is required for the flight device to land on a predetermined place before the battery power is exhausted. Thus, a takeoff/landing device that can serve as a base for the flight device to takeoff/land has been proposed. For example, Patent Literature 1 (PTL 1, JP2016-175490A) discloses a takeoff/landing device that guides the landing position to the normal position even if the flight device lands slightly out of position.

SUMMARY

An electronic device according to an embodiment includes:
an attachment mechanism configured to attach a flight device;
a first slide mechanism configured to slide the attachment mechanism in a first direction; and
a second slide mechanism configured to slide the attachment mechanism in a second direction different from the first direction.

A method for controlling an electronic device according to an embodiment includes:
an attaching step of attaching a flight device to an attachment mechanism;
a first sliding step of sliding the attachment mechanism in a first direction; and
a second sliding step of sliding the attachment mechanism in a second direction different from the first direction.

A program for controlling an electronic device according to an embodiment causes a computer to execute:
an attaching step of attaching a flight device to an attachment mechanism;
a first sliding step of sliding the attachment mechanism in a first direction; and
a second sliding step of sliding the attachment mechanism in a second direction different from the first direction.

BRIEF DESCRIPTION OF THE DRAWINGS

In the accompanying drawings.

BRIEF DESCRIPTION OF THE DRAWINGS

Convenience can be enhanced if a flight device can be easily stopped safely at a predetermined place. Also, convenience can be further enhanced if the issue of the land occupied by the flight device could be addressed when the flight device is stopped at a predetermined place. This disclosure relates to provide an electronic device configured to enhance convenience when a flight device is stopped, a method for controlling the electronic device and a program for controlling the electronic device. According to an embodiment, an electronic device configured to enhance convenience when a flight device is stopped, a method for controlling the electronic device and a program for controlling the electronic device are provided.

An electronic device according to an embodiment can be a stopping device configured to stop a flight device. Here, the flight device may typically be an unmanned small flight device such as a drone, for example. Further, the stopping device configured to stop a flight device may also be a device used in an application such as a base like a docking station, for example, where a flight device is stopped. The stopping device may be communicable with a flight device by stopping the flight device. Further, the stopping device may be capable of grasping the failure state of the flight device, obtaining the information on the charge state of the battery of the flight device, and charging the battery of the flight device, by stopping the flight device. The electronic device according to an embodiment will be described in detail below with reference to the drawings.

Figure 1:
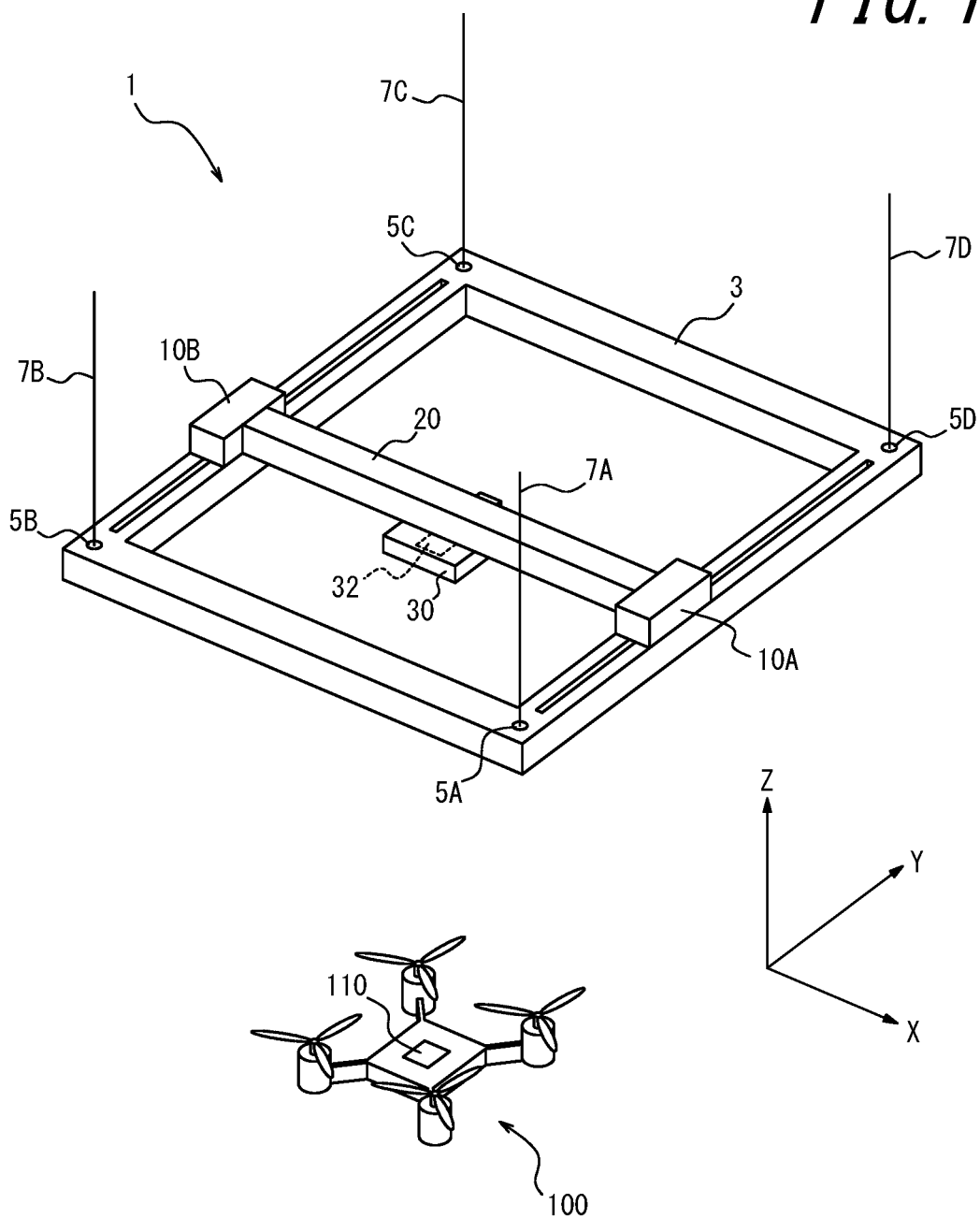
FIG. 1 is a perspective view illustrating an appearance of an electronic device according to an embodiment.

FIG. 1 is a perspective view illustrating an electronic device according to an embodiment along with a flight device.

As illustrated in FIG. 1, an electronic device 1 according to an embodiment can be installed in a state hung from any place. In the following description, the Z-axis positive direction illustrated in the figure is the "upward" direction and the Z-axis negative direction is the "downward" direction. Here, the "downward" direction may typically be vertical, and may be the direction of gravity. Further, as illustrated in FIG. 1, the electronic device 1 according to an embodiment can receive approach of the flight device 100 from under the electronic device 1 (toward the Z-axis positive direction). In this manner, the electronic device 1 can stop the flight device 100.

In an embodiment, the flight device 100 may be a device having various flight functions capable of floating in the air even if the moving speed in the horizontal direction is low. For example, the flight device 100 may typically be an unmanned small helicopter, a multicopter, a drone, an airship, a balloon, or an unmanned flying object referred to as an unmanned aerial vehicle (UAV). Here, the drone is not limited to a military UAV, and may be the one that is used for various purposes other than the military purposes. For example, the drone may have a CCD image sensor and include an application of capturing images during a flight. Further, the drone may include, for example, an application of transporting parts used in a factory from one place to another. Moreover, in an embodiment, the flight device 100 may be remotely controlled by radio or autonomously controlled (autopilot).

The flight device 100 is not limited to the one illustrated in FIG. 1 and may be any flight device. Further, as illustrated in FIG. 1, the flight device 100 may include an attachment portion 110, which will be described later, on the upper surface side (when viewed in the Z-axis negative direction). In the following description, an example in which the flight device 100 is a drone including four rotors as illustrated in FIG. 1 will be described.

As illustrated in FIG. 1, the electronic device 1 according to an embodiment includes, in appearance, a frame 3, first slide mechanisms 10A and 10B, a second slide mechanism 20 and a follow-up portion 30. The shape of the electronic device 1 is rectangular in FIG. 1, but is not limited thereto. The shape of the electronic device 1 may be circular, oval, triangular, square or other polygonal as well as other shapes or any combination of these shapes.

The frame 3 is a member that serves as a base of the electronic device 1. The frame 3 may be a member that defines overall size of the electronic device 1. The electronic device 1 according to an embodiment stops the flight device 100 inside the frame 3 (the frame 3 may be included). In an embodiment, the frame 3 may have an appropriate size as a stopping device that stops the flight device 100. Specifically, the frame 3 may be configured as a frame having a size of 1.5 m square, for example. The frame 3 may be made of a material having appropriate strength such as iron or aluminum, or carbon graphite. Further, the frame 3 may be made of a material such as a synthetic resin as long as it can maintain a certain level of strength. In an embodiment, the frame 3 may be made of any material as long as it can maintain the strength as a frame member.

Further, as illustrated in FIG. 1, hanger connecting portions 5A, 5B, 5C, and 5D are provided near the four corners of the frame 3. Corresponding hangers 7A, 7B, 7C and 7D are connected to these hanger connecting portions 5A, 5B, 5C and 5D, respectively. Hereinafter, when respective hanger connecting portions 5A, 5B, 5C and 5D are not distinguished, they may be simply referred to as "hanger connecting portions 5." Similarly, when respective hangers 7A, 7B, 7C and 7D are not distinguished, they may be simply referred to as "hangers 7."

The hanger connecting portions 5 may be any mechanism provided for connecting the hangers 7. The hanger connecting portions 5 may each be configured, for example, as a mechanism to which a hook is mounted so that each hanger 7 can be wound around the hook. In addition, the hanger connecting portions 5 may be configured such that the hangers 7 are mounted by welding, for example. The hanger connecting portions 5 may have any structure as long as the hangers 7 have a mechanism that maintains a strong connection of a certain level.

The hangers 7 are members that hang the electronic device 1 from any place such as a ceiling, for example. The hangers 7 may be disposed at a position in the Z-axis positive direction with respect to the position of the frame 3 of the electronic device 1, for example, as a reference. The hangers 7 may be composed of any material, such as wire or rope, that can withstand the load of hanging the electronic device 1. If the hangers 7 are composed of a material that has a certain thickness (diameter), the electronic device 1 can be stably fixed when being hung from any place, such as a ceiling, for example. Therefore, according to such a configuration, the unstableness of the electronic device 1 hung by the hangers 7 can be reduced. On the other hand, the electronic device 1 may be fixed, in a hung state, by members different from the hangers 7 and the hanger connecting portions 5.

Further, the electronic device 1 can be mounted to various places such as any place at a ceiling top plate by using the hangers 7. The electronic device 1 can be also mounted by hanging, for example, to the eaves of the roofs of a building, a girder (under the bridge) of a bridge over a river, the sea or a lake, highways, overpasses, electric lights, signals, telephone poles, electric wires, cars, buses, trains, airplanes, helicopters, trees, street trees, advertising boards, wireless waves, chimneys, building walls, platform ceilings of stations, ceilings of tunnels, etc., and any other places.

Figure 2:
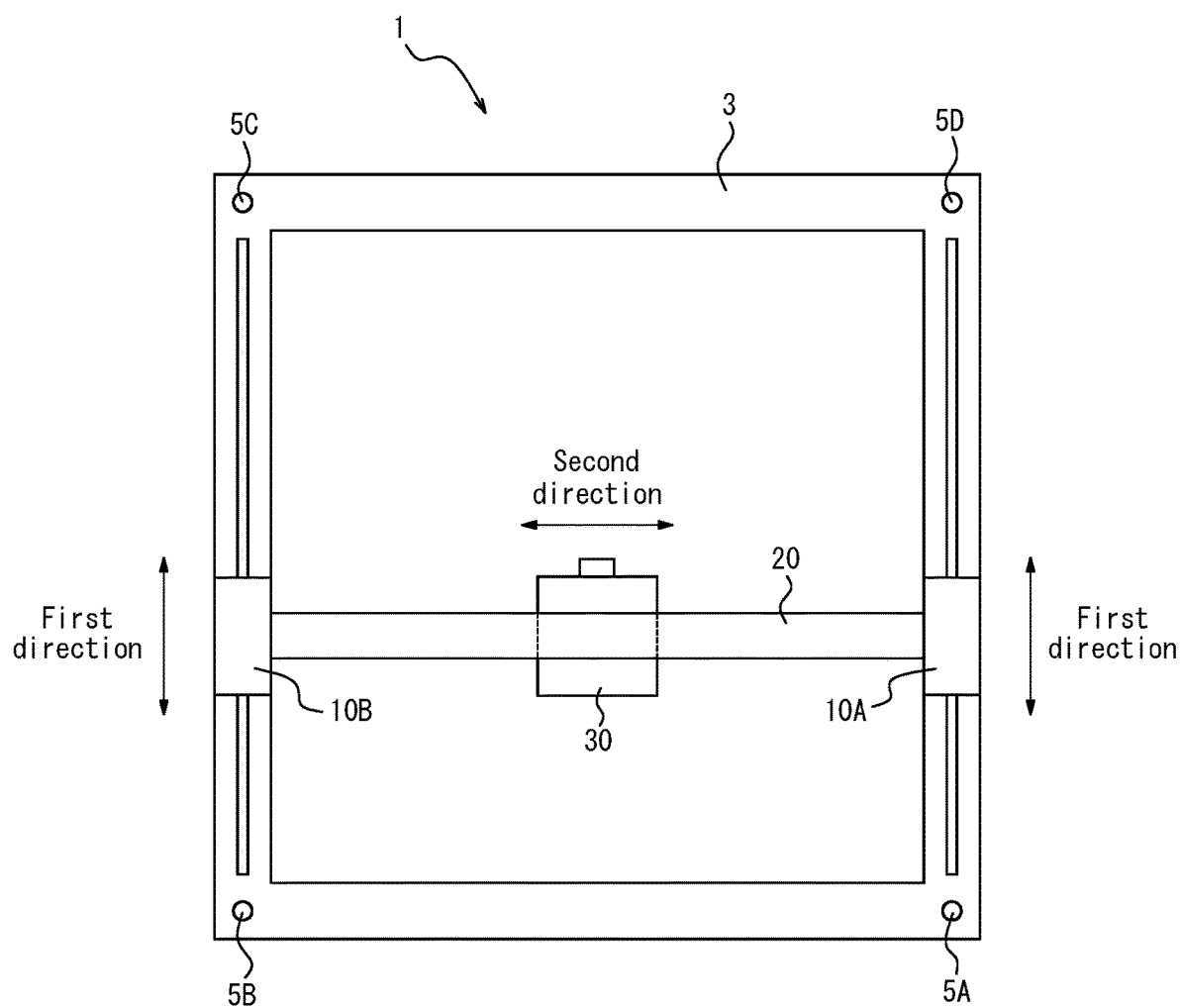
FIG. 2 is a top view illustrating the electronic device according to an embodiment when viewed in the Z-axis negative direction.

FIG. 2 is a diagram illustrating the electronic device 1 illustrated in FIG. 1 viewed from above in the Z-axis negative direction. In FIG. 2, the hangers 7 illustrated in FIG. 1 are omitted.

As illustrated in FIGS. 1 and 2, the first slide mechanisms 10A and 10B are mounted to the frame 3. In the examples illustrated in FIGS. 1 and 2, the first slide mechanisms 10A and 10B are provided along two sides, of the four sides forming the outer shape of the frame 3, that are substantially parallel to the Y-axis. Hereinafter, when the two first slide mechanisms 10A and 10B are not particularly distinguished, they may be simply referred to as "first slide mechanisms 10."

The first slide mechanisms 10A and 10B slide along the two sides of the frame 3 that are substantially parallel to the Y-axis. As illustrated in FIGS. 1 and 2, the second slide mechanism 20 is mounted between the first slide mechanism 10A and the first slide mechanism 10B. Therefore, the second slide mechanism 20 can slide on the frame 3 in the Y-axis direction by slide of the first slide mechanisms 10A and 10B. As illustrated in FIG. 2, the direction in which the first slide mechanisms 10 slide (the Y-axis direction) is also referred to as the "first direction."

The first slide mechanisms 10 may be any mechanism that allows the second slide mechanism 20 to slide in at least one direction on the frame 3. For example, as illustrated in FIGS. 1 and 2, the first slide mechanisms 10 may be mechanisms that slide along the grooves formed in the Y-axis direction on the frame 3. Further, in FIGS. 1 and 2, as the first slide mechanisms 10, only the outline (housing) of the functional portion that incorporates a mechanism for sliding the second slide mechanism 20 is illustrated. The housing of the first slide mechanisms 10 may be made of any material having appropriate strength such as iron or aluminum, or carbon graphite, or synthetic resin. In addition, when the electronic device 1 is expected to be installed outdoors, a structure that prevents rainwater and the like from entering the housing of the first slide mechanism 10 may be adopted.

The first slide mechanism 10 may be configured to slide with respect to the frame 3 by driving a motor with electric power, for example. For example, the first slide mechanism 10 provided with a motor may slide on the frame 3 by the power of the motor. Specifically, a roller chain combined with a sprocket may be linearly moved (slid) by rotationally driving the sprocket with a motor included in the first slide mechanism 10. In this case, if the roller chain is connected to a predetermined position of the frame 3, the first slide mechanism 10 can be slid with respect to the frame 3.

Further, for example, the frame 3 provided with a motor may slide the first slide mechanism 10 on the frame 3 by the power of the motor. Specifically, the roller chain combined with a sprocket may be linearly moved (slid) by rotationally driving the sprocket with a motor included in the frame 3. In this case, if the roller chain is connected to a predetermined position of the first slide mechanism 10, the first slide mechanism 10 can be slid with respect to the frame 3.

Further, the first slide mechanism 10 may adopt a mechanism including a winch, for example, instead of the combination of a sprocket and a roller chain as described above. Specifically, a winch having a drum around which a wire rope is wound may be rotationally driven by a motor included in the first slide mechanism or the frame 3. In this case, if the wire rope is connected to the frame 3 or the predetermined position of the first slide mechanism 10, the first slide mechanism 10 can be slid with respect to the frame 3.

The first slide mechanism 10 may also adopt a mechanism including a lead screw, for example, instead of the winch as described above. Specifically, a nut engaged with a threaded screw shaft may be linearly moved by rotating the screw shaft incorporated in the frame 3 by a motor included in the frame 3. In this case, if the nut is connected to the first slide mechanism 10, the first slide mechanism 10 can be slid with respect to the frame 3.

With the above described configuration, one of the first slide mechanism 10 and the frame 3 can slide with respect to the other. Here, although the first slide mechanism 10 and the frame 3 have been described as different functional portions, the first slide mechanism 10 can be any functional portion that can slide the second slide mechanism 20. Therefore, in some embodiments, the first slide mechanism 10 may be various functional portions that include at least a part of at least one of the first slide mechanism 10, the second slide mechanism 20 and the frame 3 illustrated in FIGS. 1 and 2, for example.

In an embodiment, both the first slide mechanisms 10A and 10B may be mechanisms having power such as a motor. On the other hand, in another embodiment, only one of the first slide mechanisms 10A and 10B may be a mechanism having power such as a motor, and the other may be a mechanism that smoothly slides as a free end without having power.

Further, in an embodiment, at least one of the first slide mechanisms 10A and 10B may be slidable in both positive and negative directions of the first direction. That is, as illustrated in FIGS. 1 and 2, at least one of the first slide mechanisms 10A and 10B may be slidable in both the positive and negative directions of the Y-axis. On the other hand, in another embodiment, for example, the first slide mechanism 10A may have power to slide only in the Y-axis positive direction, and the first slide mechanism 10B may have power to slide only in the Y-axis negative direction.

As described above, the second slide mechanism 20 is mounted between the first slide mechanism 10A and the first slide mechanism 10B. Further, as illustrated in FIGS. 1 and 2, the follow-up portion 30 is mounted to the second slide mechanism 20. Therefore, the follow-up portion 30 mounted to the second slide mechanism 20 also slides in the first direction by sliding the first slide mechanisms 10A and 10B in the Y-axis direction (the first direction illustrated in FIG. 2).

The follow-up portion 30 is a functional portion that follows the movement (or the position) of the flight device 100 when the flight device 100 approaches the electronic device 1 to stop. Further, the lower side (e.g. the lower surface) of the follow-up portion 30 has an attachment mechanism 32. The attachment mechanism 32 attaches the flight device 100. Typically, the attachment mechanism 32 can attach to the attachment portion 110 disposed on the upper surface side of the flight device 100, for example. The follow-up portion 30 and the attachment mechanism 32 will be further described below.

Figure 3:
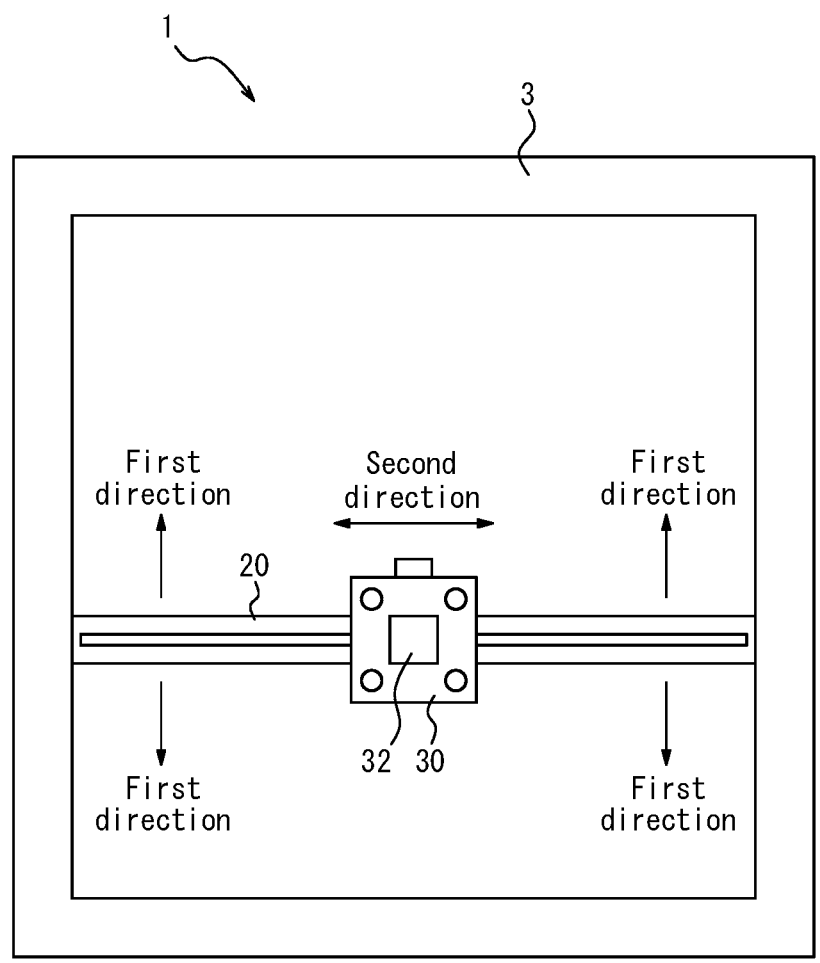
FIG. 3 is a bottom view illustrating the electronic device according to an embodiment when viewed in the Z-axis positive direction.

FIG. 3 is a diagram illustrating the electronic device 1 in FIGS. 1 and 2 when viewed from under in the Z-axis positive direction. FIG. 3 is a diagram illustrating a state in which the electronic device 1 illustrated in FIG. 2 is inverted with respect to the Y axis.

As illustrated in FIGS. 1 to 3, the second slide mechanism 20 is disposed substantially parallel to the X axis between the first slide mechanism 10A and the first slide mechanism 10B. In an embodiment, the second slide mechanism 20 may slide in the first direction while maintaining a state substantially parallel to the X axis. Further, the second slide mechanism 20 mounted between the first slide mechanism 10A and the first slide mechanism 10B slides the follow-up portion 30.

As illustrated in from FIGS. 1 to 3, the follow-up portion 30 is mounted to the second slide mechanism 20. Therefore, the second slide mechanism 20 allows the follow-up portion 30 to slide on the second slide mechanism 20 in the X-axis direction. As illustrated in FIGS. 2 and 3, the direction in which the follow-up portion 30 slides on the second slide mechanism 20 is also referred to as the "second direction." The above described first direction and the second direction may be different from each other so that the follow-up portion 30 has a two-dimensional movable range.

The second slide mechanism 20 may be any mechanism capable of sliding the follow-up portion 30 on the second slide mechanism 20 in at least one direction. For example, as illustrated in FIG. 3, the second slide mechanism 20 may be a mechanism that slides the follow-up portion 30 along the groove formed in the X-axis direction on the second slide mechanism 20. Further, in FIGS. 1 to 3, for the second slide mechanism 20, only the outline (housing) of a functional portion that incorporates a mechanism for sliding the follow-up portion 30 is illustrated. The housing of the second slide mechanism 20 may be made of any material having appropriate strength such as iron or aluminum, carbon graphite, or synthetic resin. Further, when the electronic device 1 is expected to be installed outdoors, a structure that prevents rainwater from entering the housing of the second slide mechanism 20 may be adopted.

The second slide mechanism 20 may slide the follow-up portion 30 by driving a motor with electric power, for example. For example, the second slide mechanism 20 provided with a motor may slide the follow-up portion 30 by the power of the motor. Further, for example, the follow-up portion 30 provided with a motor may slide with respect to the second slide mechanism 20 by the power of the motor. The configuration in which the second slide mechanism 20 slides the follow-up portion 30 can adopt various configurations, similarly to the configuration in which the first slide mechanism 10 slides the second slide mechanism 20. Thus, a more detailed description of the second slide mechanism 20 will be omitted.

With the above described configuration, one of the second slide mechanism 20 and the follow-up portion 30 can slide with respect to the other. Here, although the second slide mechanism 20 and the follow-up portion 30 are described as separate functional portions, the second slide mechanism 20 can be any functional portion that slides the follow-up portion 30. Therefore, in some embodiments, the second slide mechanism 20 may be various functional portions that include at least a part of at least one of the first slide mechanism 10, the second slide mechanism 20, the frame 3 and the follow-up portion 30 illustrated in FIGS. 1 to 3, for example.

As described above, in an embodiment, the first slide mechanism 10 allows the second slide mechanism 20 to freely slide in the first direction. Further, in an embodiment, the second slide mechanism 20 allows the follow-up portion 30 to freely slide in the second direction. Thus, in an embodiment, at least one of the first slide mechanism 10 and the second slide mechanism 20 allows the follow-up portion 30 to change its position within the frame 3. It is to be noted that the first direction in which the second slide mechanism 20 slides is not limited to the case of being parallel to the Y axis, and may be any direction, for example, the direction of a line at an angle of 45° with respect to the X axis. Further, the second direction in which the follow-up portion 30 slides is not limited to the case of being parallel to the X-axis, and may be any direction, for example, the direction of a line at an angle of 30° with respect to the X axis. The angle formed by the first direction and the second direction may be any angle.

Hereinafter, the follow-up portion 30 will be further described.

In FIGS. 1 to 3, the follow-up portion 30 is illustrated as an outline (housing) of a functional portion that incorporates a function and the like that attaches the flight device 100. The housing of the second slide mechanism 20 may be made of any material having appropriate strength such as iron or aluminum, carbon graphite, or synthetic resin. Further, when the electronic device 1 is expected to be installed outdoors, a structure that prevents rainwater from entering the housing of the second slide mechanism 20 may be adopted.

Figure 4:
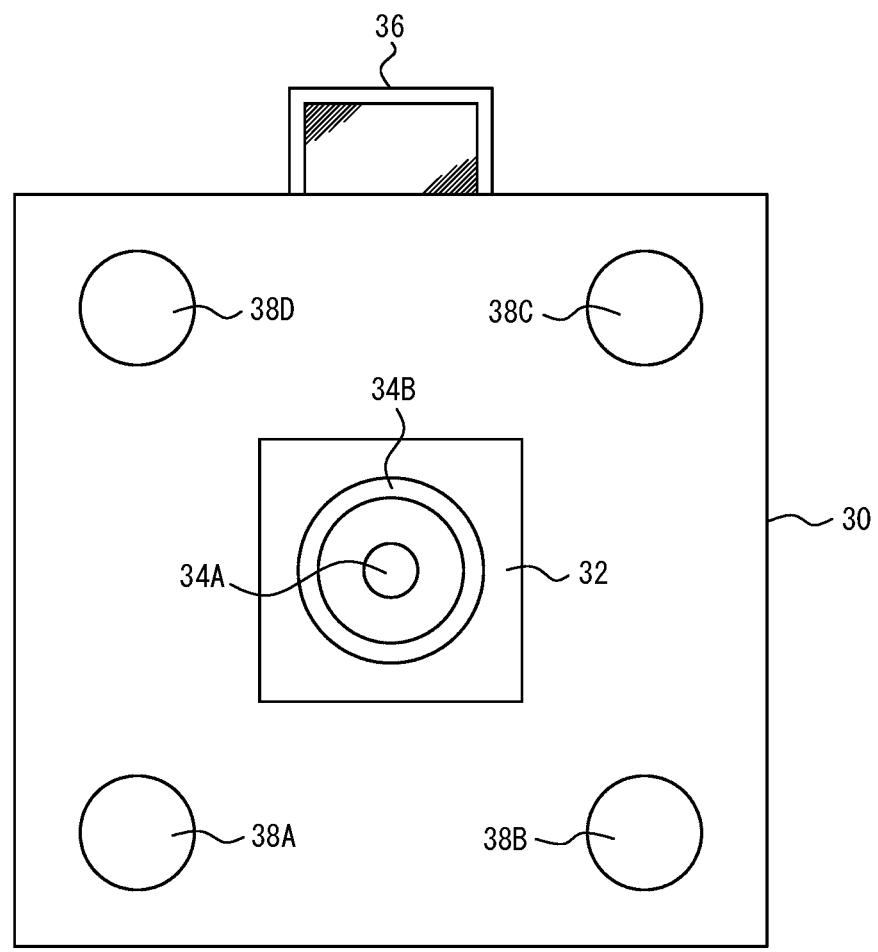
FIG. 4 is an enlarged view of a follow-up portion of the electronic device according to an embodiment.

FIG. 4 is an enlarged view of the follow-up portion 30 of the electronic device 1 illustrated in FIG. 3. As illustrated in FIG. 4, the follow-up portion 30 includes an attachment mechanism 32, contacts 34A and 34B, an imaging unit 36, and light emitters 38A, 38B, 38C and 38D.

The attachment mechanism 32 is a functional portion that attaches the flight device 100. The attachment mechanism 32 may attach the flight device 100 by a magnetic force. The attachment mechanism 32 may be, for example, a member coated with a material having an appropriate adhesiveness, and may attach the flight device 100 that approaches the electronic device 1 in search of stop. Further, the attachment mechanism 32 may be configured to have an appropriate thickness in the Z-axis direction, that is, to have a shape that appropriately protrudes downward. With the above described configuration, even in the state where the attachment mechanism 32 of the follow-up portion 30 attaches to the attachment portion 110 of the flight device 100, the rotating rotor of the flight device 100 can be prevented from coming into contact with other members.

Further, from the viewpoint of not only attaching the flight device 100 to the attachment mechanism 32 of the electronic device 1 but also separating the stopping flight device 100 from the electronic device 1, the attachment mechanism 32 may be configured so that the presence or absence of the attachment function can be switched. The attachment mechanism 32 that allows attachment by a magnetic force may switch the presence and absence of magnetic force between on and off so as to configure the presence and absence of the attachment function to be switchable.

In this case, for example, when the attachment mechanism 32 includes a permanent magnet, the flight device 100 can be attracted and attached to the attachment mechanism 32 if the flight device 100 has a ferromagnetic substance such as iron. As illustrated in FIG. 1, the flight device 100 may include the attachment portion 110 composed of a ferromagnetic material such as iron on its upper surface side (when viewed in the Z-axis negative direction) so that a magnetic force of the attachment mechanism 32 acts on the flight device 100. Further, for example, if the attachment portion 110 of the flight device 100 is composed of a permanent magnet, the attachment mechanism 32 can be simply composed of a ferromagnetic substance such as iron. In this manner, the attachment mechanism 32 can attach the attachment portion 110 of the flight device 100.

Further, for example, if the attachment mechanism 32 is configured to include an electromagnet and the flight device 100 has a ferromagnetic material such as iron, switching on the electromagnet allows the flight device 100 to be attracted and attached to the attachment mechanism 32. Further, in this case, switching off the electromagnetic allows the flight device 100 to be separated from the attachment mechanism 32. Also in this case, as illustrated in FIG. 1, the flight device 100 may include the attachment portion 110 composed of a ferromagnetic material such as iron on the upper surface side (when viewed in the Z-axis negative direction) so that the magnetic force of the attachment mechanism 32 acts thereon.

Further, the attachment mechanism 32 may be configured to include a functional portion, such as a magnet base, that switches between on and off of the magnetic force acting on the flight device 100. A commercially available magnet base can switch between on and off of the magnetic force generated at a predetermined position of the magnet base by operating a selector switch such as a lever or a dial, for example. That is, the magnet base can switch between on and off of the function, as a magnet, of attracting a ferromagnetic material such as iron. Therefore, on and off of the magnetic force acting on the flight device 100 can be switched by operating a magnet-based selector switch by any power mechanism such as a servo motor, for example. In this case, the attachment mechanism 32 requires electric power only when a motor or the like is driven to switch the selector switch. Therefore, unlike the above described electromagnet, electric power is not consumed while the magnetic force is exerted, so that power consumption can be saved.

The contacts 34A and 34B may be electrical contacts composed of copper or the like having a low resistance value. Although FIG. 4 illustrates two contacts 34A and 34B as an example, any number of contacts may be provided as necessary. Hereinafter, when the two contacts 34A and 34B are not particularly distinguished, they may be simply referred to as "contacts 34." Further, the shape of the contacts 34 is not limited to the shape illustrated in FIG. 4, and may be of any shape as necessary, such as a triangle, a rectangle, any polygon, an oval or any other appropriate shape or a combination thereof.

The contacts 34 electrically connect the electronic device 1 and the flight device 100 when the attachment mechanism 32 attaches to the attachment portion 110 of the flight device 100. Thus, the attachment portion 110 or near the attachment portion 110 of the flight device 100 may also have contacts in contact with the contacts 34. When the electronic device 1 and the flight device 100 are electrically connected via the contacts 34, the electronic device 1 can supply power to the flight device 100, for example. Therefore, the electronic device 1 can charge the battery of the flight device 100 via the contacts 34. Further, the electronic device 1 may perform data communication with the flight device 100, for example, by electrically connecting with the flight device 100 via the contacts 34. Various kinds of communications may be performed when the electronic device 1 and the flight device 100 are docked by electrically connecting the electronic device 1 and the flight device 100 via contacts 34.

The imaging unit 36 may be composed of various imaging devices such as a CCD image sensor. The imaging unit 36 captures an image of the flight device 100 approaching the electronic device 1. In FIG. 4, although only one imaging unit 36 is illustrated as an example, an imaging unit of any number, form and configuration may be provided as needed. Further, in an embodiment, an imaging unit may not be provided when the position of the flight device 100 can be confirmed in some detail by the electronic device 1 through communication and the like.

The light emitters 38A, 38B, 38C, and 38D may be composed of various light emitting devices such as light emitting diodes. In FIG. 4, although four light emitters 38A, 38B, 38C, and 38D are illustrated as an example, any number of light emitters may be provided at any position as needed. Further, in an embodiment, a light emitter may not be provided to simplify the configuration. Hereinafter, when four light emitters 38A, 38B, 38C and 38D are not particularly distinguished, they may be simply referred to as "light emitters 38." The shape of the light emitters 38 is not limited to the form illustrated in FIG. 4, and the light emitters 38 may take any form as needed.

In this manner, the electronic device 1 according to an embodiment includes the attachment mechanism 32, the first slide mechanism 10 and the second slide mechanism 20. In an embodiment, the attachment mechanism 32 attaches the flight device 100. For example, the attachment mechanism 32 may attach the flight device 100 by a magnetic force. Further, in an embodiment, the first slide mechanism 10 slides the attachment mechanism 32 in the first direction (e. g. in the Y-axis direction). Further, in an embodiment, the second slide mechanism 20 slides the attachment mechanism 32 in the second direction (e. g. in the X-axis direction) different from the first direction (e. g. in the Y-axis direction). Furthermore, the electronic device 1 according to an embodiment may include the imaging unit 36. The imaging unit 36 captures an image of the flight device 100.

Further, as illustrated in FIG. 1, in the electronic device 1 according to an embodiment, the attachment mechanism 32 can attach the flight device 100 approaching from under the electronic device 1. In this manner, the electronic device 1 may attach the flight device 100 from under the attachment mechanism 32 when the flight device 100 stops.

Figure 5:
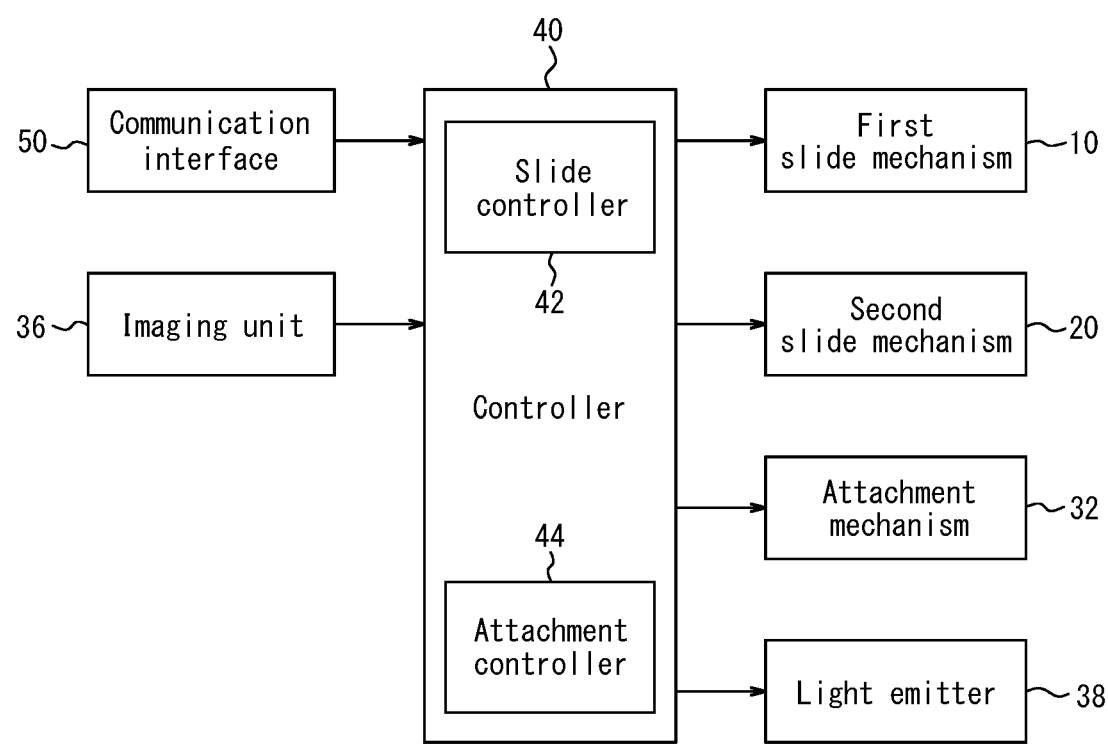
FIG. 5 is a functional block diagram schematically illustrating a configuration of the electronic device according to an embodiment.

FIG. 5 is a functional block diagram schematically illustrating a configuration of the electronic device 1 according to an embodiment. The functional configuration of the electronic device 1 according to an embodiment will be described below.

As illustrated in FIG. 5, the electronic device 1 according to an embodiment includes the first slide mechanism 10, the second slide mechanism 20, the attachment mechanism 32, the imaging unit 36, the light emitter 38, the controller 40 and the communication interface 50. The first slide mechanism 10, the second slide mechanism 20, the attachment mechanism 32, the imaging unit 36 and the light emitter 38 are as described above, and thus a detailed description thereof will be omitted.

The controller 40 may include at least one processor, such as a Central Processing Unit (CPU), to provide control and processing power for performing various functions. The controller 40 may be implemented collectively by one processor, several processors, or each individual processor. The processor may be implemented as a single integrated circuit. The processor may be implemented as a plurality of communicatively connected integrated circuits and discrete circuits. The processor may be implemented based on various other known techniques. In an embodiment, the controller 40 may be configured as a CPU and a program executed by the CPU, for example. The controller 40 may appropriately include storage such as a memory necessary for the operation of the controller 40. The storage may store a program executed by the controller 40, a result of the processing executed by the controller 40, and the like. Further, the storage may serve as a work memory for the controller 40. Operation of the controller according to an embodiment will be described later.

Further, the controller 40 may also include a slide controller 42 and an attachment controller 44. The slide controller 42 may be a functional portion that controls mainly at least one of the first slide mechanism 10 and the second slide mechanism 20. The attachment controller 44 may be a functional portion that mainly controls the attachment mechanism 32. The slide controller 42 and the attachment controller 44 may be configured as a part of the controller 40 or configured separately from the controller 40. Operation of the slide controller 42 and the attachment controller 44 will also be further described below.

The communication interface 50 can realize various functions including wireless communication. The communication interface 50 may realize communication by various communication methods such as Long Term Evolution (LTE). The communication interface 50 may include, for example, a modem whose communication system is standardized in the International Telecommunication Union Telecommunication Standardization Sector (ITU-T). The communication interface 50 may wirelessly communicate with an external device such as an external server or a cloud server over a network, for example, via an antenna. In an embodiment, the communication interface 50 may receive various kinds of information about the flight device 100 from an external database such as an external server or a cloud server. For example, the communication interface 50 may receive the position information of the flight device 100 at any time. Further, various kinds of information received by the communication interface 50 in this manner may be stored in storage provided at any position. Further, the communication interface 50 may be an interface for the electronic device 1 to communicate various kinds of information with the other device by wire.

Furthermore, the communication interface 50 may realize wireless communication by various methods such as Wi-Fi or Bluetooth (registered trademark). The communication interface 50 may communicate with the communication interface of the flight device 100 by radio via an antenna, for example. In an embodiment, the communication interface 50 may receive various kinds of information about the flight devices from various flight devices such as the flight device 100. For example, the communication interface 50 may receive position information at a certain time and the like of the flight device.

The above described controller 40 and the communication interface 50 may be disposed at any position of each functional portion of the electronic device 1, or may be disposed, separately from the electronic device 1, in the vicinity of the electronic device 1, for example.

Figure 6:
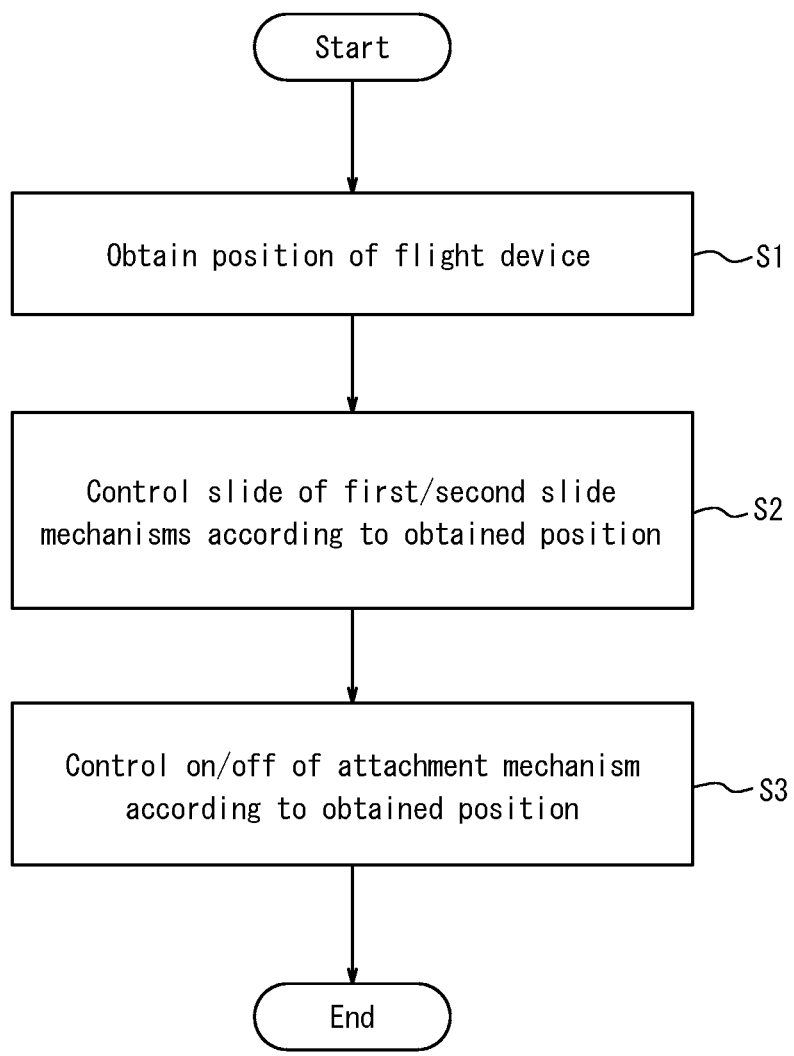
FIG. 6 is a flowchart illustrating an operation of the electronic device according to an embodiment.

Next, the operation of the electronic device 1 according to an embodiment will be described. FIG. 6 is a flowchart for describing the operation of the electronic device 1 according to an embodiment.

At the time when the operation illustrated in FIG. 6 is started, it is assumed that the flight device 100 is attempting to stop at the electronic device 1 that is present nearby, as illustrated in FIG. 1, for example. As such a situation, for example, a situation is assumed in which the flight device 100 stops at the electronic device 1 and attempts to charge its battery because the remaining battery capacity is low in flight. Further, as a situation described above, for example, a situation is assumed in which the flight device 100 is about to stop at the electronic device 1 in search of a temporary evacuation site for expected bad weather (rain and/or strong wind). Further, as a situation described above, for example, it is also assumed that the flight device 100, which has departed from the electronic device 1, for example, is returning to the electronic device 1 after finishing a predetermined work.

Further, at the time when the operation illustrated in FIG. 6 is started, as illustrated in FIG. 1, the X-coordinate and the Y-coordinate at the position of the flight device 100 are assumed to be within the frame 3 of the electronic device 1. Here, it is assumed that the flight device 100 can fly by the wireless remote control or autonomous control (autopilot) in a situation where the X-coordinate and the Y-coordinate at the position of the flight device 100 are within the frame 3 of the electronic device 1. Moreover, in this case, as described above, it is assumed that the flight device 100 approaches the attachment mechanism 32 from under the electronic device 1.

When the operation illustrated in FIG. 6 is started, the controller 40 of the electronic device 1 obtains the position of the flight device 100 that attempts to stop at the electronic device 1 (step S1). In step S1, the controller 40 may receive a position of the flight device 100 from the communication interface 50, for example. In this case, the position of the flight device 100 may be received from an external database such as an external server or a cloud server, for example. In this case, the position information of the flight device 100 may be managed so as to be updated moment by moment in the external database or the like. Further, if communication with the flight device 100 is possible, the position information may be obtained directly from the flight device 100. In this case, the controller 40 may obtain the position of the flight device 100 using a GPS, for example.

Furthermore, in step S1, the controller 40 may determine the position of the flight device 100 on the basis of an image captured by the imaging unit 36, for example. Specifically, when the imaging unit 36 captures an image of the flight device 100, the controller 40 can determine the position of the flight device 100 with respect to the electronic device 1 on the basis of an image captured by the imaging unit 36 and an angle of field capable of being captured by the imaging unit 36. Further, the controller 40 may determine the flight device 100 or the position of the flight device 100 by applying a technique such as publicly known image processing or image recognition to an image captured by the imaging unit 36. In this manner, in the electronic device 1 according to an embodiment, the controller 40 may determine the position of the flight device 100 on the basis of an image captured by the imaging unit 36. In this case, when the ambient light is insufficient such as at night, for example, the light emitter 38 may be caused to emit light to illuminate the flight device 100.

Further, the controller 40 may trigger the operation illustrated in FIG. 6 on the basis of the position information of the flight device 100 described above. That is, when determining that the X-coordinate and the Y-coordinate at the position of the flight device 100 that attempts to stop at the electronic device 1 are within the frame 3 of the electronic device 1 on the basis of the position information of the flight device 100, the controller 40 may start the operation illustrated in FIG. 6.

When the position of the flight device 100 is obtained in step S1, the controller 40 controls at least one of the first slide mechanism 10 and the second slide mechanism 20 according to the obtained position of the flight device 100 (step S2). In step S2, the controller 40 may control at least one of the first slide mechanism 10 and the second slide mechanism 20 so that the follow-up portion 30 including the attachment mechanism 32 follows the flight device 100. In step S2, the controller 40 may control at least one of the first slide mechanism 10 and the second slide mechanism 20 so that the attachment mechanism 32 follows the attachment portion 110 of the flight device 100. Here, the slide controller 42 may control at least one of the first slide mechanism 10 and the second slide mechanism 20.

Figure 7:
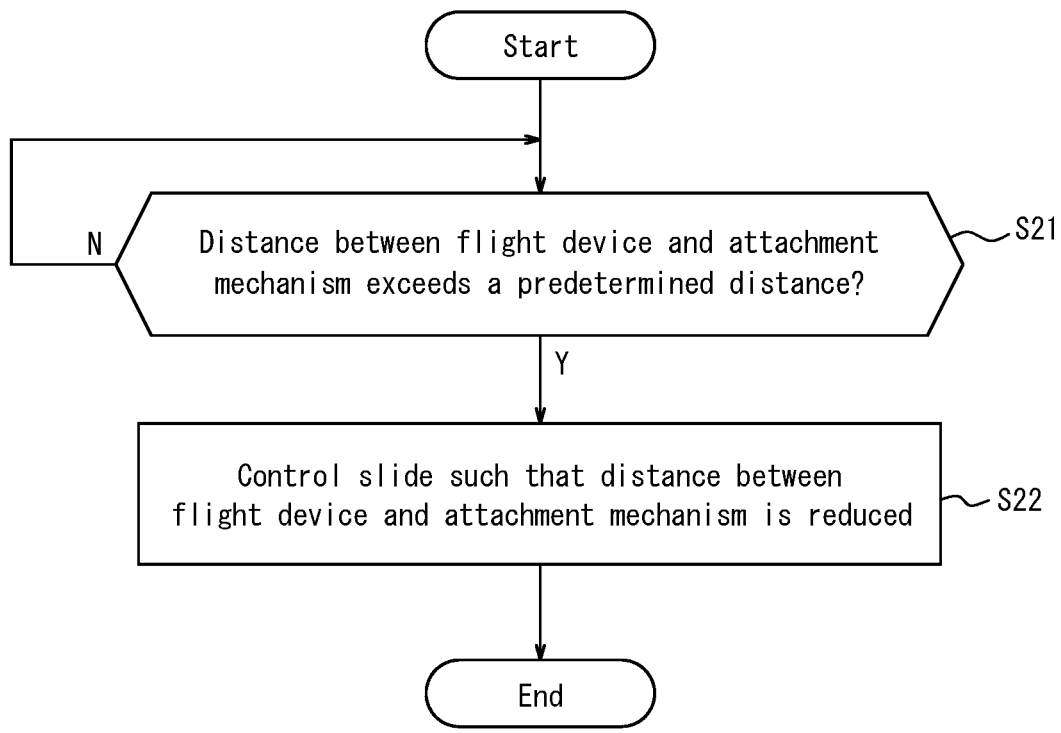
FIG. 7 is a flowchart illustrating an operation of the electronic device according to an embodiment.

FIG. 7 is a flowchart that describes the slide control performed by the slide controller 42 in more detail. FIG. 7 illustrates an example of the processing illustrated in step S2 of FIG. 6 in more detail.

When the operation illustrated in FIG. 7 is started, the slide controller 42 determines whether or not a distance between (the attachment portion 110 of) the flight device 100 and the attachment mechanism 32 exceeds a predetermined distance (step S21). When it is determined that the above described distance does not exceed the predetermined distance in step S21, the slide controller 42 finishes the operation illustrated in FIG. 7 and performs the processing of step S3 illustrated in FIG. 6. On the other hand, when it is determined that the above described distance exceeds the predetermined distance in step S21, the slide controller 42 controls so that the distance between (the attachment portion 110 of) the flight device 100 and the attachment mechanism 32 is reduced (step S22). Here, in step S22, the slide controller 42 may control at least one of the first slide mechanism 10 and the second slide mechanism 20 so that the attachment mechanism 32 will follow the attachment portion 110 of the flight device 100. After the processing of step S22, the slide controller 42 finishes the operation illustrated in FIG. 7 and performs the processing of step S3 illustrated in FIG. 6.

As described above, at the time of step S21, the X-coordinate and the Y-coordinate at the position of the flight device 100 are within the frame 3 of the electronic device 1. Here, the predetermined distance in step S21 may be set in advance, for example, as a distance at which the attachment mechanism 32 of the follow-up portion 30 needs to follow the X-coordinate and the Y-coordinate at the position of the flight device 100. For example, if the position of the flight device 100 on the XY plane is apart from the position of the attachment mechanism 32 on the XY plane by more than 10 cm, there is an increased risk that the attachment portion 110 of the flight device 100 cannot be attached to the attachment mechanism 32 safely and easily. In this case, in an embodiment, the above described predetermined distance may be 10 cm.

Further, when the position of the flight device 100 on the XY plane is apart from the position of the attachment mechanism 32 on the XY plane by more than 10 cm in step S21, the slide controller 42 performs the processing of step S22. In step S22, the slide controller 42 controls at least one of the first slide mechanism 10 and the second slide mechanism 20 so that the distance between the position of the flight device 100 on the XY plane and the position of the attachment mechanism 32 on the XY plane is reduced.

In this manner, in an embodiment, the slide controller 42 may control the slide of the attachment mechanism 32. Specifically, the slide controller 42 may control the slide of the attachment mechanism 32 by at least one of the first slide mechanism 10 and the second slide mechanism 20. As a control in this case, for example, the slide controller 42 may control the attachment mechanism 32 so as to slide in at least one of the Y-axis direction and the X-axis direction according to the position of the flight device 100 until the flight device 100 attaches to the attachment mechanism 32.

Furthermore, for example, the slide controller 42 may control the slide of the attachment mechanism 32 when the distance between the flight device 100 and the attachment mechanism 32 exceeds the predetermined distance at least one of the Y-axis direction and the X-axis direction. In this case, for example, the slide controller 42 may control the slide of the attachment mechanism 32 so that the distance between the flight device 100 and the attachment mechanism 32 is reduced in at least one of the Y-axis direction and the X-axis direction. It is to be noted that the slide controller 42 may control the slide of the attachment mechanism 32 when the distance between the flight device 100 and the attachment mechanism 32 exceeds the predetermined distance in at least one of the Y-axis direction and the X-axis direction. In this case, for example, the slide controller 42 may control the slide of the attachment mechanism 32 so that the distance between the flight device 100 and the attachment mechanism 32 is reduced in at least one of the Y-axis direction and the X-axis direction. In this case, in FIG. 7, the processing after Yes is replaced with the processing after No in step S21.

When the processing of step S22 illustrated in FIG. 7, that is, the processing of step S2 illustrated in FIG. 6, is finished, the controller 40 performs the processing of step S3.

In step S3, the controller 40 controls so that on and off of the attachment mechanism 32 is switched according to the position of the flight device 100 obtained in step S1. For example, in step S3, the controller 40 may control so that the magnetic force exerted by the attachment mechanism 32 on the attachment portion 110 is switched on at the time when the distance between the attachment mechanism 32 of the follow-up portion 30 and the attachment portion 110 of the flight device 100 in the Z-axis direction is reduced. Here, the attachment controller 44 may control the attachment mechanism 32.

Figure 8:
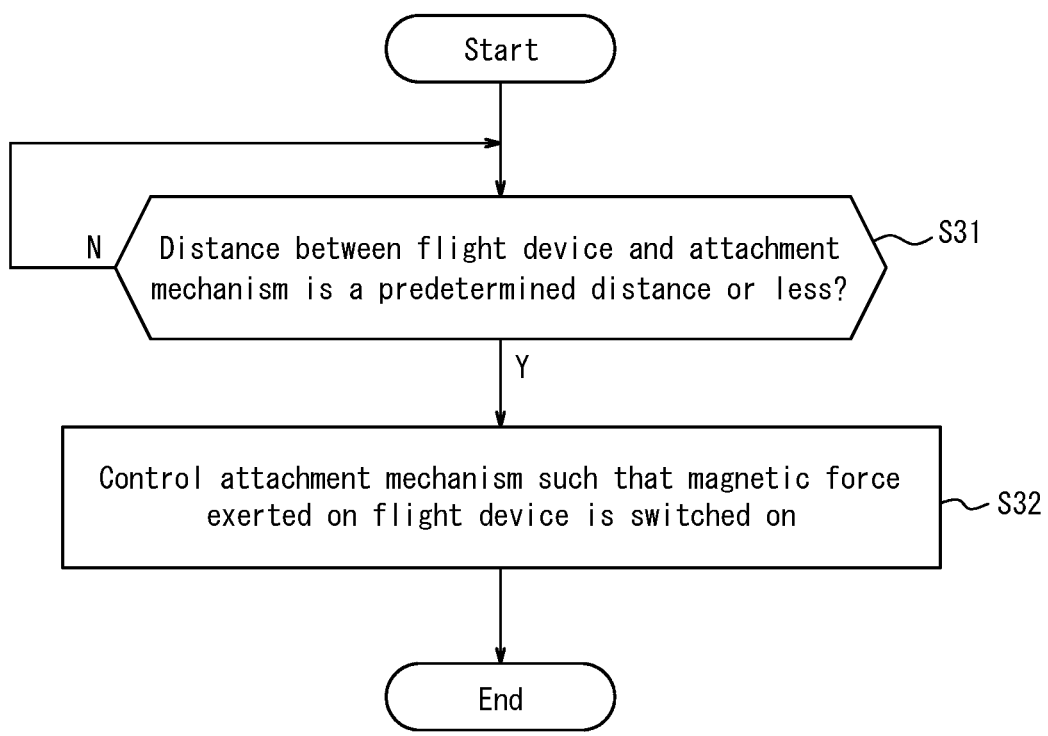
FIG. 8 is a flowchart illustrating an operation of the electronic device according to an embodiment.

FIG. 8 is a flowchart illustrating the control of the attachment mechanism 32 performed by the attachment controller 44 in more detail. FIG. 8 illustrates an example of the processing illustrated in step S3 of FIG. 6 in more detail.

When the operation illustrated in FIG. 8 is started, the attachment controller 44 determines whether or not the distance between (the attachment portion 110 of) the flight device 100 and the attachment mechanism 32 is within the predetermined distance (step S31). In particular, in step S31, whether or not the distance between the attachment portion 110 of the flight device 100 and the attachment mechanism 32 in the Z-axis direction is the predetermined distance or less may be determined. When the above described distance is determined not to be the predetermined distance or less in step S31, the attachment controller 44 finishes the operation illustrated in FIG. 8 and finished the processing of step S3 illustrated in FIG. 6. On the other hand, when the above described distance is determined to be the predetermined distance or less in step S31, the attachment controller 44 controls so that the magnetic force exerted by the attachment mechanism 32 on (the attachment portion 110 of) the flight device 100 is switched on (step S32). After the processing of step S32, the attachment controller 44 finishes the operation illustrated in FIG. 8, that is, finishes the processing of step S3 illustrated in FIG. 6.

Here, the predetermined distance in step S32 may be set in advance as a distance by which the attachment portion 110 is easily attached to the attachment mechanism 32 by acting the magnetic force of the attachment mechanism 32 on the attachment portion 110 of the flight device 100, for example. For example, when the attachment portion 110 of the flight device 100 approaches the attachment mechanism 32 to 5 cm or less in the Z-axis direction, the attachment portion 110 of the flight device 100 is assumed to be easily attached to the attachment mechanism 32. In this case, in an embodiment, the above described predetermined distance may be 5 cm.

When the distance between the attachment portion 110 of the flight device 100 and the attachment mechanism 32 in the Z-axis direction is 5 cm or less in step S31, the attachment controller 44 performs the processing of step S32. In step S32, the attachment controller 44 controls so that the magnetic force exerted by the attachment mechanism 32 on the attachment portion 110 of the flight device 100 is switched on. In this manner, the attachment portion 110 of the flight device 100 approaching the follow-up portion 30 of the electronic device 1 attaches to the attachment mechanism 32.

Here, as described above, the attachment controller 44 may control on/off of the magnetic force of the attachment mechanism 32 on the basis of the (one dimensional) distance between the attachment mechanism 32 and the attachment portion 110 in the Z-axis direction, for example. The attachment controller 44 may also control on/off of the magnetic force of the attachment mechanism 32 on the basis of the (two dimensional) positional relationship between the position of the attachment mechanism 32 on the XY plane and the position of the attachment portion 110 on the XY plane, for example. Moreover, the attachment controller 44 may control on/off of the magnetic force of the attachment mechanism 32 based on the (three dimensional) positional relationship, which is a combination of the above described positional relationships between the attachment mechanism 32 and the attachment portion 110.

In this manner, in an embodiment, the attachment controller 44 may control switching on and off of the magnetic force exerted by the attachment mechanism 32 on the flight device 100. Specifically, the attachment controller 44 may control switching on and off of the magnetic force exerted by the attachment mechanism 32 on the flight device 100 according to the two-dimensional or three-dimensional position of the flight device 100 until the flight device 100 attaches to the attachment mechanism 32. Further, in this case, the attachment controller 44 may control so that the magnetic force exerted by the attachment mechanism 32 on the flight device 100 will be switched on when the distance between the flight device 100 and the attachment mechanism 32 is the predetermined distance or less.

The operation illustrated in FIG. 6 may be controlled so that a series of operations from step S1 to step S3 illustrated in FIG. 6 is repeated. That is, when the processing of step S3 is finished, the controller 40 may start the processing of step S1 again immediately or after a predetermined time has elapsed. In this manner, the electronic device 1 according to an embodiment can allow the position of the follow-up portion 30 that includes the attachment mechanism 32 to follow according to the position of the flight device 100 until the flight device 100 attaches to the attachment mechanism 32. Further, the electronic device 1 according to an embodiment can allow the flight device 100 to attach to the attachment mechanism 32 by exerting a magnetic force of the attachment mechanism 32 when the flight device 100 approaches the attachment mechanism 32. Therefore, when the flight device 100 attempts to stop at the electronic device 1 and approaches thereto, even if the position where the flight device 100 floats deviates to some extent due to factors such as unstable wind direction, the flight device 100 can stop at the electronic device 1 safely and easily.

As described above, according to the electronic device 1 of an embodiment, for example, the flight device 100 can be stopped at a predetermined place of the electronic device 1 safely and easily. That is, according to the electronic device 1 of an embodiment, when the flight device 100 attempts to stop, the risk of damage or malfunction of the flight device 100 caused by unsuccessful docking due to the wind is reduced. Further, according to the electronic device 1 of an embodiment, since the follow-up portion 30 follows according to the position of the flight device 100, it is possible to facilitate the maneuvering (maneuvering by a pilot or autopilot) when the flight device 100 docks. Moreover, according to the electronic device 1 of an embodiment, when the flight device 100 is stopped at a predetermined place, for example, it is possible to deal with the issue of the land occupied by the flight device 100. Therefore, according to the electronic device 1 of an embodiment, it is possible to enhance the convenience when the flight device 100 or the like is stopped.

Other features of the electronic device 1 according to an embodiment will be described below.

The electronic device 1 according to an embodiment has been described on the assumption that the electronic device 1 is installed hanging from any position, as illustrated in FIG. 1. In this manner, as described above, the electronic device 1 can stop the flight device 100 under a bridge, for example. Thus, it is advantageous when the flight device 100 is flown mainly over a river. When the flight device 100 is landed on the ground or the like, a place (land) at which each flight device 100 is stopped is required. However, since the electronic device 1 according to an embodiment is installed hanging from a predetermined place, it is not necessary to land the flight device 100 on the ground. Thus, when the flight device 100 such as a drone becomes more popular in the future, the issue of the place at which a drone stops can be addressed.

Further, the electronic device 1 according to an embodiment is not necessarily limited to the use mode in which the electronic device 1 is installed in a stationary state, and the electronic device 1 may be disposed on a top plate of various moving bodies such as trucks, buses, or trains. According to such a use mode, the electronic device 1 can move with the flight device 100 stopped thereat.

On the other hand, in an embodiment, for example, the electronic device 1 may be used upside down the state illustrated in FIG. 1. In this case, the attachment portion 110 of the flight device 100 may be disposed on the lower side of the flight device 100. Further, in this case, the attachment portion 110 of the flight device 100 and the attachment mechanism 32 of the follow-up portion 30 in the electronic device 1 may be omitted.

In the electronic device 1 according to an embodiment, determination of the flight device 100 or the position of the flight device 100 using the imaging unit 36 of the follow-up portion 30 can be performed by using various existing techniques. For example, the controller 40 may determine the presence of the flight device 100 by analyzing a difference of a color, a shape or the like between each of frames in an image captured by the imaging unit 36 constantly or at predetermined time intervals. Further, for example, a light emitter having a predetermined color and/or brightness may be mounted on the flight device 100 to facilitate recognition in the electronic device 1 using the imaging unit 36. Other than that, for example, a fluorescent tape of a predetermined color may be attached to the flight device 100 to serve as a marking so that the electronic device 1 can easily recognize it by using the imaging unit 36.

In order to charge the battery of the flight device 100 in the electronic device 1, for example, a solar cell may be connected to the electronic device 1 and a predetermined storage battery may be charged with electric power generated using sunlight. Further, when charging the battery of the flight device 100 in the electronic device 1, it may be contactlessly charged, or may be charged after being connected by the contacts 34, for example.

In the electronic device 1 according to an embodiment, whether the flight device 100 can be stopped or not may be determined. For example, the flight device 100, which is registered in advance in a predetermined electronic device 1 by a predetermined contract or the like, may be permitted to be stopped at the electronic device 1. In this case, for example, the flight device 100, which is not registered in advance in a predetermined electronic device 1 and no predetermined contract is made, may not be permitted to be stopped at the electronic device 1. When the flight device 100 not permitted to be stopped attempts to stop at the electronic device 1, the controller 40 may control so that measures are taken such that the follow-up portion 30 of the electronic device 1 is not allowed to follow the movement of the flight device 100 or the attachment mechanism 32 of the follow-up portion does not attach to the electronic device.

As described above, when whether or not the flight device 100 can be stopped is determined, various aspects can be assumed with respect to identification of a plurality of flight devices 100. For example, the electronic device 1 may identify a plurality of flight devices 100 through direct wireless communication with the flight device 100. Further, the electronic device 1 may identify a plurality of flight devices 100 based on the information obtained from an external database such as an external server or a cloud server, for example. Further, for example, the electronic device 1 may identify a plurality of flight devices 100 by reading a QR code (registered trademark) attached to the flight device 100 using the imaging unit 36 when the flight device 100 approaches. Further, when an RF tag is attached to the flight device 100, for example, the flight device 100 may be identified by receiving the electric power supply from the electronic device 1 (without using the electric power of the flight device 100) and reading the RF tag.

For the convenience of description, in the above described embodiment, one flight device 100 is stopped at the electronic device 1. However, in the electronic device 1 according to an embodiment, a plurality of flight devices 100 may be stopped. In this case, for example, a plurality of follow-up portions 30 may be provided to one electronic device 1. Further, in the electronic device 1 including one follow-up portion 30, when the flight device 100 attaches to the attachment mechanism 32 of the follow-up portion 30, the flight device 100 may be released after the follow-up portion 30 transfers the flight device 100 to a predetermined storage. In this case, when the flight device 100 is transferred to a predetermined storage, the electronic device 1 can prepare for an arrival of the next flight device 100. In addition, a predetermined storage may store a plurality of flight devices 100.

Various aspects can be assumed for determination of the flight device 100 having approached the electronic device 1 when the flight device 100 attempts to stop at the electronic device 1 and approaches thereto. For example, approach of the flight device 100 that attempts to stop may be detected by detecting radio waves or ultrasonic waves transmitted by the flight device 100, for example.

Further, the processing by the flight device 100 may be changed by detecting that the flight device 100 approaches the electronic device 1. For example, the controller 40 may put the electronic device 1 into a sleep mode to reduce power consumption until approach of the flight device 100 to the electronic device 1 is detected. Further, the controller 40 may set the frame rate at which the imaging unit 36 of the electronic device 1 captures an image to a relatively low value until approach of the flight device 100 to the electronic device 1 is detected. In this case, when approach of the flight device 100 to the electronic device 1 is detected, the controller 40 may set the frame rate at which the imaging unit 36 captures an image to a relatively high value.

In the above described embodiment, the flight device 100 may fly or float autonomously by autopilot, or may be human-operated by remote control.

Although this disclosure has been described on the basis of the drawings and examples, it is to be noted that various changes and modifications can be easily made by those skilled in the art on the basis of this disclosure. Therefore, such changes and modifications are to be understood as included within the scope of this disclosure. For example, the functions and the like included in each functional portion may be rearranged in any logically consistent way. Further, a plurality of functional portions or the like may be combined into one or divided. Each embodiment according to the above described disclosure is not limited to being faithfully implemented in accordance with the above described each embodiment, and may be implemented by appropriately combining each feature or omitting a part thereof as appropriate.

The above described embodiment is not limited to only an implementation as the electronic device 1. For example, the above described embodiment may be implemented as a method for controlling a device such as the electronic device 1. Furthermore, for example, the above described embodiment may be implemented as a program for controlling a device such as the electronic device 1.

REFERENCE SIGNS LIST

1 Electronic device (stopping device)
3 Frame
5 Hanger connecting portion
7 Hanger
10 First slide mechanism
20 Second slide mechanism
30 Follow-up portion
32 Attachment mechanism (magnet base)
34 Contact
36 Imaging unit
38 Light emitter
40 Controller
42 Slide controller
44 Attachment controller
50 Communication interface
100 Flight device (drone)
110 Attachment portion

The invention claimed is:

1. An electronic device, comprising:
an attachment mechanism configured to attach a flight device;
a first slide mechanism configured to slide the attachment mechanism in a first direction;
a second slide mechanism configured to slide the attachment mechanism in a second direction different from the first direction; and
a slide controller configured to control sliding of the attachment mechanism by at least one of the first slide mechanism and the second slide mechanism.

2. The electronic device according to claim 1, wherein the attachment mechanism attaches the flight device by a magnetic force.

3. The electronic device according to claim 2, comprising an attachment controller configured to control switching between on and off of a magnetic force exerted by the attachment mechanism on the flight device.

4. The electronic device according to claim 3, wherein the attachment controller controls switching between on and off of the magnetic force exerted by the attachment mechanism on the flight device according to a two or three dimensional position of the flight device until the flight device attaches to the attachment mechanism.

5. The electronic device according to claim 4, wherein the attachment controller controls so that the magnetic force exerted by the attachment mechanism on the flight device is switched on when a distance between the flight device and the attachment mechanism is a predetermined distance or less.

6. The electronic device according to claim 1, wherein the slide controller controls the attachment mechanism to slide in at least one of the first direction and the second direction according to a position of the flight device until the flight device attaches to the attachment mechanism.

7. The electronic device according to claim 6, wherein the slide controller controls slide of the attachment mechanism so that a distance between the flight device and the attachment mechanism is reduced in at least one of the first direction and the second direction when the distance between the flight device and the attachment mechanism exceeds a predetermined distance in at least one of the first direction and the second direction.

8. The electronic device according to claim 4, comprising an imaging unit configured to capture an image of the flight device, wherein a position of the flight device is determined based on an image captured by the imaging unit.

9. The electronic device according to claim 1, wherein the flight device is attached from under the attachment mechanism when the flight device is stopped.

10. A method for controlling an electronic device, comprising:
- an attaching step of attaching a flight device to an attachment mechanism;
- a first sliding step of sliding an attachment mechanism in a first direction; and
- a second sliding step of sliding the attachment mechanism in a second direction different from the first direction, wherein
- a slide controller controls sliding of the attachment mechanism in at least one of the first sliding step and the second sliding step.

11. A non-transitory computer-readable recording medium storing computer program instructions, which when executed by a computer, cause the computer to:
- attach a flight device to an attachment mechanism;
- slide an attachment mechanism in a first direction; and
- slide the attachment mechanism in a second direction different from the first direction, wherein
- the computer controls a slide controller to control sliding of the attachment mechanism in at least one of the first direction and the second direction.

\* \* \* \* \*